Sept. 7, 1965
H. A. KERMAN
3,204,726
ROPE LOCKING DEVICE
Filed Dec. 12, 1961
2 Sheets-Sheet 2
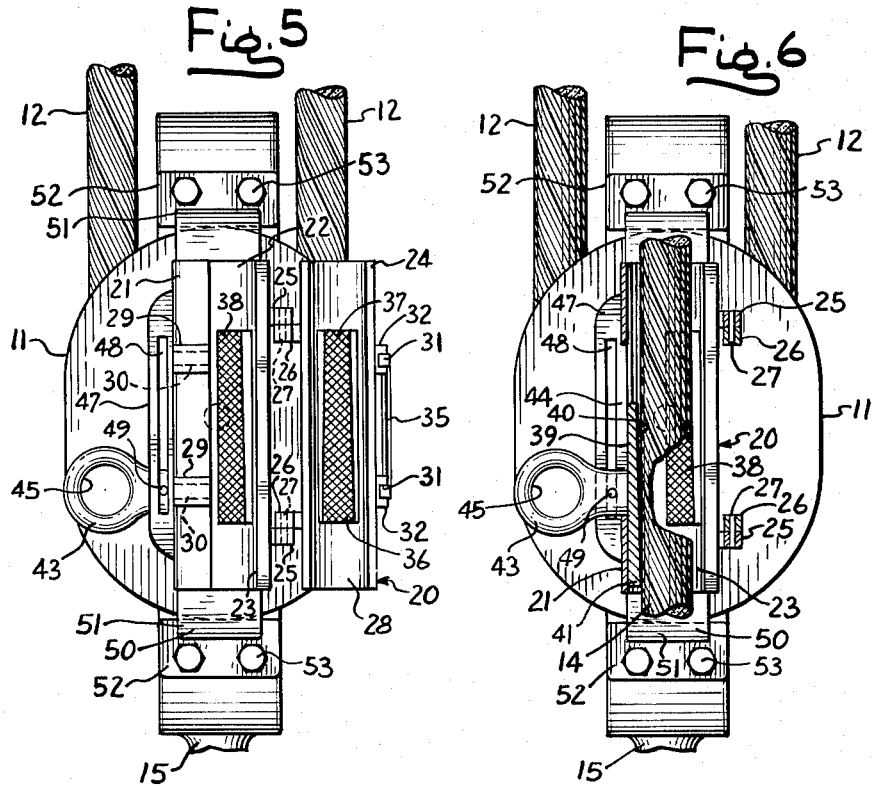
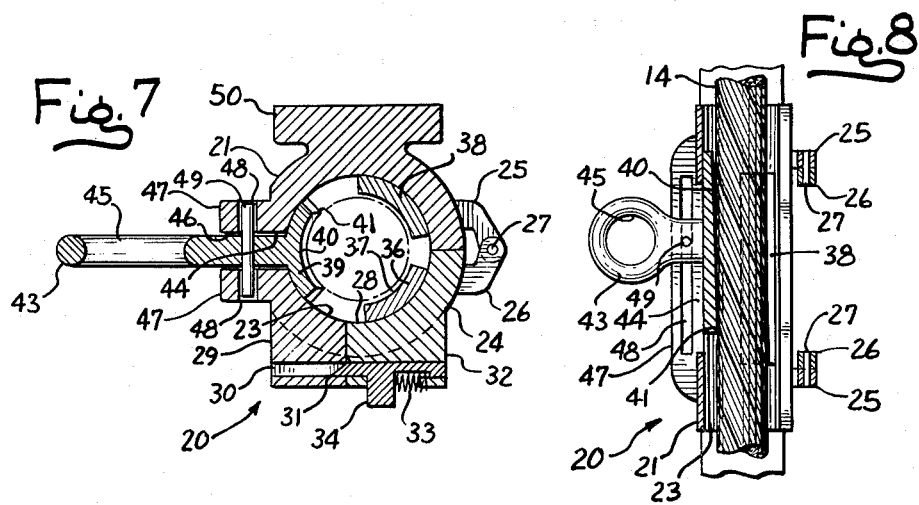
INVENTOR.
HOWARD A. KERMAN
BY
ATTYS.

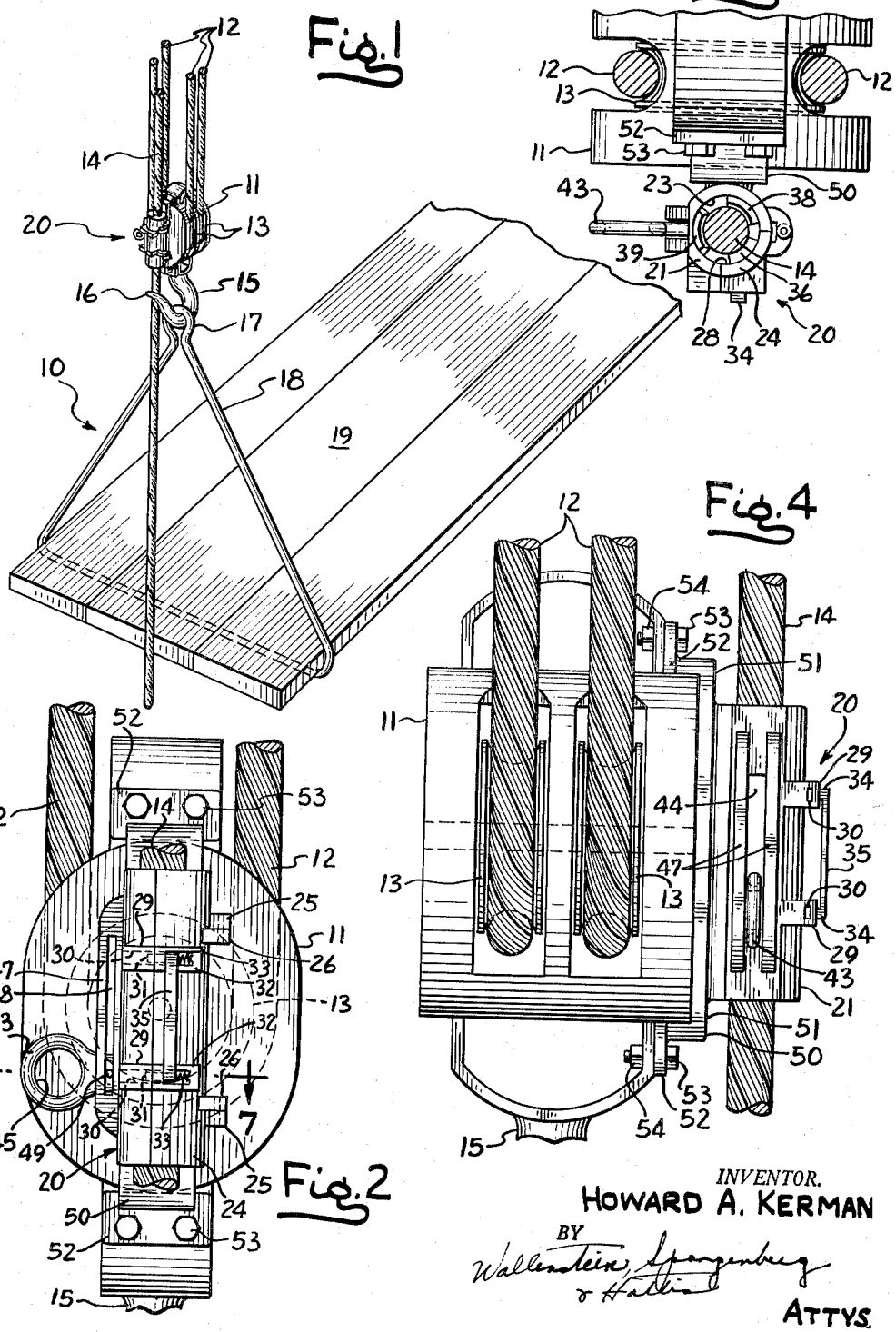

United States Patent Office 3,204,726
Patented Sept. 7, 1965

3,204,726
ROPE LOCKING DEVICE
Howard Allen Kerman, 5140 W. Fairview Lane,
Skokie, Ill.
Filed Dec. 12, 1961, Ser. No. 158,820
4 Claims. (Cl. 188—65.2)

This invention relates to a rope locking device having utility in connection with adjustably mounting swinging scaffolds, or the like, commonly used, for example, in constructing and maintaining buildings.

Workmen, in order to provide a stage or platform on which to maneuver and to support equipment and materials at difficult to reach locations on the interior and exterior of structures such as buildings, generally employ a vertically adjustable scaffold. In the usual case, such apparatus utilizes a pair of hooks secured to the building in any convenient and safe manner, each of the hooks supporting a pulley block from which ropes extend to a lower pair of pulley blocks spaced from and aligned with the upper pulley blocks. The lower pulley blocks are provided with means for supporting a horizontal stage or platform. Vertical adjustment of the platform with respect to the upper pulley blocks is achieved by means of a control rope associated with each of the lower blocks and manually operable by a workman standing on the platform. It is necessary after each adjustment of the platform to secure the control ropes in some manner to prevent the platform from tilting, or, of more serious consequence, from falling.

Conventionally the securing of the control ropes is accomplished by simply looping a section of it around a convenient portion of the scaffold and forming an easily released knot to prevent the rope from slipping. The frequency of this practice is an indication that rope locking devices presently available having possible utility in this regard are adaptable to only special types of scaffolding apparatus or do not satisfactorily perform the function for which they were intended because they are not reliable or are two difficult to use, or because they do not hold the rope with sufficient tightness.

It is an object of this invention to provide a convenient, simple to operate, safe and fool-proof rope locking device having utility in adjustably mounting scaffolds or the like.

It is another object of this invention to provide a rope locking device as just described which is useable with ropes of varying sizes.

It is also an object of this invention to provide a rope locking device for scaffolds or the like where the weight of the scaffold maintains the rope locking action of the device.

It is a further object of this invention to provide a rope locking device having utility in adjustably mounting scaffolds or the like which is extremely durable and yet inexpensive to manufacture.

Further objects and advantages of the invention will become apparent as the description proceeds.

Briefly, in accordance with one aspect of the invention the locking device comprises means for receiving a section of rope such as the control rope of an adjustable scaffold, said means being provided with means including a rope engaging member, most advantageously a slidably mounted member, for securing the section of rope in a desired adjusted position. One or more stationary rope engaging members are advantageously provided in the rope receiving means to cooperate and coact with the slidable member. Actuation of the slidable member either to engage with or to release the rope is conveniently achieved with means connected to the slidable member and movable with relation to the rope receiving means.

The locking device is desirably provided with suitable means for attaching it to a pulley block.

In accordance with another aspect of the invention, one or more of the rope engaging members and the slidably mounted member fall along a common control surface so that the control rope is wedged in place in the locking device when the slidably mounted member is moved into tight engagement with the rope.

In accordance with still another aspect of the invention the rope receiving means is in the form of a tubular body having a cover member extending the full length of the body and movable or pivotable into an open position which leaves a slot or opening extending the full length of the body through which the scaffold control rope can readily be positioned in or removed from the rope locking device. Opening the cover section automatically releases the rope from its wedged condition thereby easing the burden of releasing the tightly wedged rope.

Other objects, advantages and features of the invention will become apparent upon making reference to the specification to follow, the claims and the drawings wherein:

FIG. 1 is a view in perspective of an embodiment of the locking device of this invention mounted on a pulley block from which one end of a scaffold depends;

FIG. 2 is a front view in elevation of an embodiment of the locking device of this invention mounted on a pulley block;

FIG. 3 is a fragmentary plan view of the embodiment of the locking device and pulley block illustrated in FIG. 2;

FIG. 4 is a side view in elevation of the embodiment of the locking device and pulley block illustrated in FIG. 2;

FIG. 5 is a front view in elevation of an embodiment of the locking device of this invention mounted on a pulley block showing details of the interior of the locking device;

FIG. 6 is a longitudinal sectional view of the embodiment of the locking device illustrated in FIG. 5 showing the relationship of the rope to the slidable rope contacting member of the locking device prior to securing the rope in the device;

FIG. 7 is a horizontal sectional view of the embodiment of the locking device with a section of rope therein; and FIG. 8 is a longitudinal sectional view of the embodiment of the locking device illustrated in FIG. 6 showing the relationship of the rope to the slidable rope contacting member after the rope has been secured in the device.

Referring now in detail to FIG. 1 of the drawings, one end of a typical scaffold assembly having utility for the purposes of this invention is designated generally at 10. The assembly 10 comprises a pulley block 11 suspended from an upper block (not shown) by means of ropes 12 wound on grooved wheels or sheaves 13 of the pulley block 11. A control rope 14 permits vertical adjustment of the assembly 10 in relation to the structure in connection with which the scaffold is being used.

In the typical assembly 10, the pulley block 11 is provided with a hook 15 having an out-turned beak 16 adapted to receive an eye 17 at the apex of a triangular frame or brace 18. The brace 18 provides support for one end of a horizontal stage or platform 19 in cooperation with an identical arrangement at the other end of the platform.

In achieving the objectives of this invention, the pulley block 11 advantageously carries a locking device, designated generally at 20, which may be secured thereto in any convenient manner. The locking device 20 is adapted to receive and secure a section of the control rope 14 to prevent uncontrolled vertical movement of the scaffold assembly 10. A similar arrangement desirably is provided at the other end of the scaffold to permit dual control of the vertical adjustment of the apparatus.

Referring now in particular to FIGS. 5 and 6, one form of the locking device 20 is shown for purposes of illustration, and desirably comprises an open ended, tubular rope receiving housing body 21 advantageously provided with a longitudinal opening or slot 22 extending the full length of the housing. The slot 22 communicates with a substantially cylindrical bore 23 in the housing 21 adapted to receive a section of the control rope 14.

In order to secure the rope 14 in the housing body 21, a cover member 24 is especially desirably provided for the slot 22. The cover member 24 may be hinged to the housing body 21 in any suitable manner. In the embodiment illustrated, this is accomplished by providing the housing body 21 and the cover member 24 with cooperating lugs 25 and 26, respectively, held in pivotable engagement with one another by means of pins 27—27.

The cover member 24 desirably is provided with a curved inner surface 28 which completes the substantially cylindrical configuration of the bore 23 when the cover member 24 is pivoted to enclose the slot 22 in the housing body 21. The cover member 24 may be held in locked relation with respect to the housing body 21 in any suitable manner. This is advantageously achieved, as best illustrated in FIG. 7, by providing the housing 21 with a pair of bosses 29—29 having openings 30—30 therethrough adapted to receive the ends of locking pins 31—31 positioned in bosses 32—32 on the cover member 24.

As clearly illustrated in FIG. 2, the pins 31—31 may desirably be urged into the openings 30—30 in the bosses 29—29 by compression springs 33—33 which abut extension 34—34 on the pins 31—31. The springs 33—33, in turn, may be conveniently simultaneously biased by movement of a connecting bar or arm 35 which may be attached to the extensions 34—34 of the bolts 31—31 in any suitable manner. This arrangement facilitates closure and release of the cover member 24 and has important advantages from the standpoint of efficiency and safety of operation of the locking device 20.

Referring again in particular to FIGS. 5 and 6, the inner surface of the cover member 24 desirably is provided with a rope engaging member which may be conveniently referred to as friction strip 36. The strip 36 advantageously is rigidly secured on the surface 28 and may have an exposed inner surface which desirably falls along the surface of a cone tapering in an upward direction. The strip 36 may be fabricated of any suitable material, metallic or otherwise, with the surface 37 thereof advantageously roughened in any manner known in the art to enchance its ability, in cooperation with other means in the device 20, to prevent slippage of the rope 14 relative thereto. The dimensions of the surface 37 of the strip 36 may vary considerably. However, it is important in achieving the desired result that sufficient contact thereby be made with a portion of the periphery of the rope 14 to enable the strip 36 and cooperating means securely to hold the rope 14 in a desired fixed position.

Turning now to the housing 21, the inner wall thereof defining the bore 23 advantageously is provided with a stationary friction strip 38 desirably having the same configuration and dimension as the strip 36 of the cover member 24. The housing body 21 further is especially desirably provided with a second friction strip 39 slidably positioned in the bore 23. The strip 39 may be fabricated of the same material as the strips 36 and 38, and is desirably provided with a roughened surface 40. The surface 40 advantageously has the contour of a segment of a cone which tapers toward the bottom portion 41 thereof. The purpose served by the conical or tapered contour of the surfaces of the friction strips is to effect a wedging action of the strips on the rope 14 to be positioned in the rope locking device.

Movement of the friction strip 39 within the bore 23 of the housing 21 is advantageously controlled by suitably attaching a handle 43 to the strip 39. The handle 43 extends exteriorly of the housing 21 through an elongated slot 44 and may be provided at its outermost extremity with an opening 45 adapted to admit a finger of an operator to facilitate manipulation of the strip 39. In order to restrict lateral movement of the handle 43, a vertical radially outwardly facing guideway or opening 46 is desirably provided therefor and may be defined between a pair of elongated extensions 47 on the housing body 21, each of the extensions 47 preferably having a vertical slot 48 facing in a direction perpendicular to the radial direction in which the guideway 46 faces and adapted to receive the ends of a horizontally extending pin 49 extending transversely of a radial line and secured in the handle 43. This arrangement to a large extent prevents any inadvertent jarring of the handle 43 from disengaging the strip 39 from its gripping engagement with the rope 14.

To facilitate attachment of the device 20 to an object such as pulley block 11, the housing 21 desirably may have secured to it in any suitable manner, such as by welding, a bracket 50 having legs 51 and flanges 52, the flanges 52 being provided with openings to accommodate fastening means such as bolts 53 and nuts 54.

In operation, and by way of illustration and not limitation, a section of the control rope 14 is introduced into the housing body 21 through slot 22, and the cover member 24 is locked in position thereover. The handle 43 is then moved upward in a direction to bring the friction strip 39 into engagement with the rope 14, as clearly shown in FIG. 8. The lower portion 41 of the strip 39 wedges the rope 14 against the cooperating friction strips 36 and 38. The wedging action of the strips 36, 38 and 39 on the rope 14 is augmented by the weight of the scaffolding on the rope 14 which maintains the movable friction strip in its upper position where it exerts a correspondingly greater pressure on the rope 14 urging it more tightly against the friction strips 36 and 38. In this manner slippage of the rope 14 is eliminated and the rope 14 is firmly and securely held in a desired fixed position. Workmen on the scaffold can proceed with their activities, secure in the knowledge that the control ropes can only be released by direct action on their part. To free the control rope 14, the pins 31 are merely disengaged from the openings 30 and the cover member 24 pivoted away from the slot 22 in the housing body 21.

While the invention has been described with reference to the use of three tapered friction strips, two of which are desirably stationary, the third being especially desirably movable in the housing of the device, it is possible to obtain satisfactory but less desirable results with less than this number and with modifications of the shapes of the friction strips. For example, either of the stationary strips 36 or 38 could possibly be eliminated, although this would not achieve best results. Furthermore, all but one of the friction strips could have cylindrical surfaces. Various other modifications of the specific embodiment of the invention shown and described will be readily apparent to persons skilled in the art and may be adopted without departing from the spirit and scope of the broader aspects of the invention.

What I claim as new and desire to protect by Letters Patent of the United States is:

1. A locking device for control ropes for adjusting the elevation of rope supported scaffiolds and the like comprising: a housing including a housing body having a vertical bore and a longitudinal rope-receiving opening or slot running the full length thereof and intersecting the bore to permit the rope to be readily passed into or out of the housing through the opening, and a cover member movably mounted on one side of the opening for movement between a closed position when said opening is closed thereby and an open position when said opening is fully open, rope locking means incuding a member movably mounted within and with respect to the vertical bore of the housing for engaging and locking said rope in the housing in one position thereof after the cover member is in its closed position, manually operable means projecting through a vertical radially outwardly facing guide opening in said housing and vertically movable with respect to said housing for actuating said rope locking member to said one position which locks the rope in place when the cover member is closed but which is ineffective to lock the rope when the cover member is open, and projection means extending from one of said manually operable means and said housing generally horizontally in a direction perpendicular to a radial line and radially facing vertical guide wall means in the other of same against which said projection means is guided to stabilize the manually operable and rope locking means against excessive radial movement.

2. A locking device for control ropes for adjusting the elevation of rope supported scaffolds and the like comprising: a housing including a housing body having a vertical bore and a longitudinal rope-receiving opening or slot running the full length thereof and intersecting the bore to permit the rope to be readily passed into or out of the housing through the opening, and a cover member movably mounted on one side of the opening for movement between a closed position when said opening is closed and an open position when said opening is fully open, rope locking means including a slidable member movably mounted within and with respect to the vertical bore of the housing for engaging and locking by wedging action said rope in the housing in one position thereof after the cover member is in its closed position, manually operable means projecting through a vertical radially outwardly facing guide opening and vertically movable with respect to said housing for actuating said slidable member to said one position which locks the rope in place when the cover member is closed but which is ineffective to lock the rope when the cover member is open, a vertical slot in said housing facing in a direction generally transverse to said vertical guide opening, and a horizontally extending pin on said manually operable means which extends within and is guided between the defining walls of said vertical slot to stabilize the manually operable and rope locking means against excessive radial movement.

3. A locking device for control ropes for adjusting the elevation of rope supported scaffolds and the like comprising: a housing including a housing body having a vertical bore and a longitudinal rope-receiving opening or slot running the full length thereof and intersecting the bore to permit the rope to be readily passed into or out of the housing through the opening, and a cover member having a rough surfaced friction member on the inner side thereof, said cover member being movably mounted on one side of the opening for movement between a closed position when said opening is closed and an open position when said opening is fully open, rope locking means including a vertically movable member and a rough surfaced friction member thereon positioned for movement axially along the defining walls of said bore and cooperating with said friction member on said cover for wedging said rope in the housing in one position of said vertically movable member, actuating means projecting through a vertically radially outwardly facing guide opening in said housing body and vertically movable with respect to said housing and connected to said vertically movable member for actuating said member to said one position which locks the rope in place when the cover member is closed but which is ineffective to lock the rope when the cover member is open, projection means extending from one of said actuating means and housing body generally in a direction perpendicular to a radial line, and a vertical guide slot in the other of same facing in a direction generally perpendicular to said vertical guide opening and in which said projection means is guided to stabilize said actuating and rope locking means against excessive radial movement.

4. A locking device for control ropes for adjusting the elevation of rope supported scaffolds and the like comprising: a housing including a housing body having a vertical bore and a longitudinal rope-receiving opening or slot running the full length thereof and intersecting the bore to permit the rope to be readily passed into or out of the housing through the opening, and a cover member movably mounted on one side of the opening for movement between a closed position when said opening is closed and an open position when said opening is fully open, a plurality of rough surfaced rope engaging friction surfaces within said bore which surfaces provide a a rope-receiving space which tapers in a downward direction, at least one of said friction surfaces being vertically movable in said bore and in the upper position of the latter reducing the space between said surfaces to wedge a section of rope in the housing, a vertically slidable handle attached to said movable surface and projecting through a radially outwardly facing vertical guide opening in said housing for actuating the surface to said upper position which locks the rope in place when the cover member is closed but which is ineffective to lock the rope when the cover member is open, a projection extending from one of said handle and housing generally horizontally in a direction perpendicular to a radial line, and a vertical slot in the other of same facing in a direction generally perpendicular to said vertical guide opening and in which said projection moves and is guided to stabilize said handle and friction surfaces against excessive radial movement.

References Cited by the Examiner

UNITED STATES PATENTS

| | | | |
|---|---|---|---|
| 527,529 | 10/94 | Leber | 188—65.2 |
| 709,580 | 9/02 | La Barte | 24—263 |
| 1,664,461 | 4/28 | Montgomery | 24—263 |
| 1,693,478 | 11/28 | Davis | 24—263 |
| 1,921,627 | 8/33 | Lucchesi | 188—65.1 |
| 2,085,237 | 6/37 | Todd | 24—263 |
| 2,343,086 | 2/44 | Schultz | 254—192 |
| 2,386,908 | 10/45 | Puckett | 24—136 |
| 2,939,550 | 6/60 | Puttre | 188—65.1 |

ARTHUR L. LA POINT, *Primary Examiner.*

BEATRICE H. STRIZAK, EUGENE G. BOTZ,
*Examiners.*